United States Patent

Curiel

[11] Patent Number: 6,164,548
[45] Date of Patent: Dec. 26, 2000

[54] METHODS OF CREATING A TAMPER RESISTANT INFORMATIONAL ARTICLE

[75] Inventor: Yoram Curiel, Moshav Hayogev, Israel

[73] Assignee: Safecard ID System, Inc., Cesarea, Israel

[21] Appl. No.: 09/019,509

[22] Filed: Feb. 5, 1998

[51] Int. Cl.[7] .................................................. G06K 19/00
[52] U.S. Cl. ........................................ 235/487; 235/457
[58] Field of Search ................................... 235/457, 489, 235/488, 487

[56] References Cited

U.S. PATENT DOCUMENTS

| | | |
|---|---|---|
| 3,582,439 | 6/1971 | Thomas . |
| 4,378,392 | 3/1983 | Segel . |
| 4,429,015 | 1/1984 | Sheptak . |
| 4,631,222 | 12/1986 | Sander . |
| 4,684,795 | 8/1987 | Colgate, Jr. . |
| 4,856,857 | 8/1989 | Takeuchi et al. . |
| 4,897,533 | 1/1990 | Lyszczarz . |
| 4,971,646 | 11/1990 | Schell et al. . |
| 5,243,641 | 9/1993 | Evans et al. . |
| 5,248,544 | 9/1993 | Kaule . |
| 5,370,763 | 12/1994 | Curiel . |
| 5,412,192 | 5/1995 | Hoss ........................................ 235/380 |
| 5,595,624 | 1/1997 | Curiel . |

OTHER PUBLICATIONS

U.S. application No. 08/652,026, Curiel, filed May 21, 1996.
U.S. application No. 08/854,717, Curiel, filed May 12, 1997.

*Primary Examiner*—Karl D. Frech
*Attorney, Agent, or Firm*—Arnold B. Silverman; Eckert Seamans Cherin & Mellott, LLC

[57] ABSTRACT

Methods of creating tamper resistant informational articles and related products are disclosed. In one method a metal foil has a hologram formed therein after which information is created on the metal foil at least partially over the hologram and the foil is encapsulated in a resinous plastic material. Encapsulation may be effected by extruding the resinous plastic material. The assembly may be separated into individual informational articles which resist tampering and resist undesired counterfeiting as by photocopying. In another embodiment, a tamper resistant informational article is provided by creating a base having an upper surface and a lower surface with an elongated metal core having extruded therearound a resinous plastic material. A magnetic media storage element is secured to this base. A lens is created by providing an elongated transparent layer, forming a hologram in the lower surface thereof and applying information to the hologram. The lens lower surface is then secured to the base upper surface to protectively surround the information. This joinder of the base and lens is preferably accomplished when the extruded resinous plastic material is at an elevated temperature. Particles which resist photocopying may be incorporated in the resinous plastic material prior to extrusion. The magnetic storage element may be an elongated magnetic strip or a microchip, for example. An antenna operatively associated with the magnetic strip or microchip may be provided. Products produced by these methods are also disclosed. In one embodiment, the metal core serves as a ground to resist undesired loss of information stored on the magnetic media. In another embodiment, a preformed transparent hologram containing article has information added thereto and is then metallized. A protective resinous layer may be secured over the metallized layer.

62 Claims, 5 Drawing Sheets

METHODS OF CREATING A TAMPER RESISTANT INFORMATIONAL ARTICLE

BACKGROUND OF THE INVENTION

1. Field of the Invention

The present invention relates to a method for creating tamper resistant informational articles and the resultant product and includes various embodiments of holograms formed within a metal layer or within a resinous plastic layer with the information to be protected being placed on the hologram as by printing, for example, and additional material protectively overlying the same.

2. Description of the Prior Art

It has been known for many purposes to provide means to protect informational articles from counterfeiting and alteration. For example, with respect to paper currency, it has been known to use special inks, graphic designs, codes and materials to make it more difficult for counterfeiters to copy the currency. It has also been known to protect cards, such as credit cards, identification cards, debit cards, membership cards and other cards from deterioration, reproduction and alteration by encasing them between a pair of laminated plastic sheets, at least one of which is transparent. See generally, U.S. Pat. No. 3,582,439. Such systems may encapsulate the information to be protected between multiple sheets of resinous plastic, such as PVC, for example, joined using heat.

It has also been known to employ holograms in credit cards and the like so as to inhibit unauthorized reproduction of the same.

U.S. Pat. 4,631,222 discloses a hot embossing foil which includes a magnetic layer and a layer which has a structure producing a diffraction effects such as a hologram. Adhesive means may be employed to secure the element to a substrate. The backing foil is adapted to be released from a transfer layer. See U.S. Pat. No. 3,582,439. U.S. Pat. No. 4,378,392 discloses a laminate which is said to extend the life of a photograph. A plurality of films are adhesively bonded in a protective relationship with respect to a photograph.

U.S. Pat. 4,897,533 discloses providing credit cards with magnetic tapes with the card being provided with a transparent film which may take the form of an ultraviolet curable varnish.

U.S. Pat. No. 5,248,544 discloses the use of holograms on paper articles.

U.S. Pat. No. 4,684,795 discloses the use of a security tape which contains an embossed holographic image on a clear polyester carrier which is then coated with ferrous oxide to form a magnetic strip with an optically viewable holographic image thereon.

U.S. Pat. No. 4,856,857 discloses the use of a transparent hologram which may be provided with an overlying removable support layer and an underlying adhesive for securement of the hologram to an article.

U.S. Pat. No. 4,971,646 discloses a holographic film product wherein a film or plastic adhesive is employed to secure a hologram film and metallized coating which underlies a printed layer and a protective layer of clear film.

U.S. Pat. No. 4,429,015 discloses a laminated identification card wherein efforts to delaminate the card result in fibers of uniaxially oriented polyethylene or polypropylene layers being torn to thereby provide a visual indication of tampering.

My U.S. Pat. 5,243,641 discloses protecting from undesired alteration articles having information added after creation of a form. This is accomplished by providing a zone of distinct appearance, such as a hologram, placing the added information thereover, and covering the added information and at least a portion of the distinctive zone with a write resistant material. In this manner, accurate photocopying of the document, so as to permit alteration, is resisted as is writing over the inserted information.

My U.S. Pat. Nos. 5,370,763 and 5,595,624 disclose a method of making a tamper evident and counterfeit resisting informational article. A hologram is applied to the article, the information is inserted over the hologram and a transparent tape is applied thereover with a write resistant coating, such as silicone resin, being applied thereover. A particular end use disclosed is in connection with creating a temporary vehicle or registration.

My U.S. patent application, Ser. No. 08/652,026, now U.S. Pat. No. 5,948,555 discloses a tamper resistant vehicular validation tab of the type frequently inserted into a recess in a vehicular license plate. As a result of differential adhesive properties provided between layers of the article, an effort to separate the same results in destruction of the integrity of the information provided therein. A further embodiment usable in connection with vehicle windows is disclosed in my U.S. patent application, Ser. No. 08/854,717.

In spite of the foregoing, there remains a very real and substantial need for providing articles which have information which may be standard information employed on all of the articles and, in some instances, additional information which is variable perhaps identifying the user or a corporate identity or the like in such a manner that the information is readily visible by the naked eye or machine readable while photocopying and access to the same for alteration or counterfeiting are effectively resisted.

SUMMARY OF THE INVENTION

The present invention provides a plurality of embodiments, each of which is adapted to provide the desired information, whether it be variable or standard information, and whether it be readable by the human eye or machine readable and stored on magnetic media. The information is physically encased within protective materials thereby precluding direct access for alteration. It also contains means which resist undesired photocopying.

The methods of the present invention reduce the number of layers and vendor supplied components required and reduce cost through streamlining the method. The methods also provide the option of full manufacture of the article at a central manufacturing facility or providing a partially fabricated article which can be completed in a simple operation at a retail store or other such location.

In one method of the invention, a hologram is formed in a metal foil layer after which the desired information is created on the metal foil, at least partially over the hologram, and the information and hologram containing metal foil is encapsulated within a resinous plastic material. The encapsulation is preferably effected by extrusion of the resinous plastic material over the foil. In the alternative, the foil may also be encapsulated by injection molding. The items may be formed in an elongated continuous strip with individual cards or other unitary articles being separate therefrom.

The method also contemplates creating a base having an upper surface and a lower surface by passing an elongated metal core through an extruder. The extruder encapsulates the metal core with a resinous plastic material, securing a magnetic media storage element to the base. A lens is created by providing an elongated transparent plastic layer and forming a hologram in the lower surface thereof with information to be protected being applied to the hologram as by printing, for example. The upper surface of the base is then secured to the lower surface of the lens. In a preferred embodiment, the securement of the lens and base is effected within a sufficient time after extrusion that the resinous plastic is at an elevated temperature from the extrusion process.

If desired, small glass beads or metallic particles may be inserted into the resinous plastic material to resist undesired photocopying of the information or the card.

In one embodiment of the invention, the metal foil core may serve as a ground which resists undesired loss of information stored on magnetic media within the card. Also, an antenna may be provided within the card so as to effect more efficient transfer of information between the card and an operably associated machine. Further, if the antenna is provided in a proper configuration, such as a coil, it may receive and store electromagnetic energy directed to the card and employ the energy to operate the card's internal system.

A tamper resistant information article may include a hologram formed in a metal foil core with information on the foil, at least partially overlying the hologram, and a resinous plastic material encapsulating the foil with the resinous plastic being transparent. The card may, for example, take the form of credit cards, smart cards, identification cards or debit cards. The information applied to the cards may be in strongly contrasting color for ready visibility. This article will resist counterfeiting.

In another embodiment of the invention, a transparent lens having an upper surface and a lower surface has a hologram formed in the lower surface thereof and information applied to the lower surface of the hologram. A base has a metal core encapsulated in a resinous plastic material. A magnetic media storage element may be secured to the base with the base being secured to the lower surface of the lens to thereby protectively encase the hologram and the information. The magnetic storage media element may be an elongated magnetic strip or a microchip, for example.

In another embodiment, a hologram may be formed in the surface of a transparent resinous material and with information being printed on the hologram with subsequent metallizing of the printed hologram by a spray or metal layer being produced thereover. A second resinous layer may be secured over the metallized printed hologram.

It is an object of the present invention to provide methods and associated products for creating an information containing article wherein the information cannot be directly accessed for alteration and the article resists counterfeiting as by photocopying.

It is a further object of the present invention to provide such a system wherein the informational articles may be made in multiple quantities which are unitary initially and subsequently severed into individual articles.

It is a further object of the present invention to provide such a method and product which is adapted to store information on magnetic storage media and in certain embodiments to have the article provided with a metal strip which serves as a ground and/or a metal strip which serves as an antenna to resist undesired loss of stored information and to enhance efficiency of communication with equipment operatively associated therewith.

It is a further object of the present invention to provide such a system which streamlines the manufacturing process and is economical to employ.

It is another object of the present invention to provide such a system wherein information may contain both (a) standard information employed on all of the articles and (b) variable information which may be keyed to the identity of a particular individual or business entity.

It is a further object of the present invention to provide such a system wherein an article can be partially made at a facility remote from the retail store or other business establishment having limited equipment which completes the manufacture thereof.

It is a further object of the present invention to provide a system which permits customized manufacture of informational articles having the security, durability and functionality desired.

These and other objects of the invention will be more fully understood from the following description on reference to the illustrations appended hereto.

DESCRIPTION OF THE PREFERRED EMBODIMENTS

As employed herein, the term "informational article" refers to an article which is adapted to provide through words, graphics, color codes or other means information which may be provided in a form visually perceived by the human eye or in machine readable form such as information stored on magnetic media, such as a magnetic strip or microchip. The term will expressly include, but not be limited to, identification cards, credit cards, debit cards, smart cards, organization membership cards, security system cards, security entry permits, and other information providing articles wherein it may be desired to resist alteration, tampering or reproduction.

As used herein, the term "hologram" is used in its conventional broad sense and includes the use of a single hologram element alone or multiple hologram elements which may or may not be touching each other or physically in close proximity to each other.

As used herein, the term "encapsulated," when employed, for example, to refer to a metal strip being encapsulated as by extrusion of a resinous plastic material therearound, it will be understood that the end portions of the elongated strip or individual articles severed therefrom, may have the metal edges exposed and, as a result, the term will embrace strips which are completely encapsulated and substantially completely encapsulated, such as where strip ends are exposed. The term "metal strip" will include a strip made of metal, as well as other materials which have been partially or totally covered by a metal layer.

Figure 1:
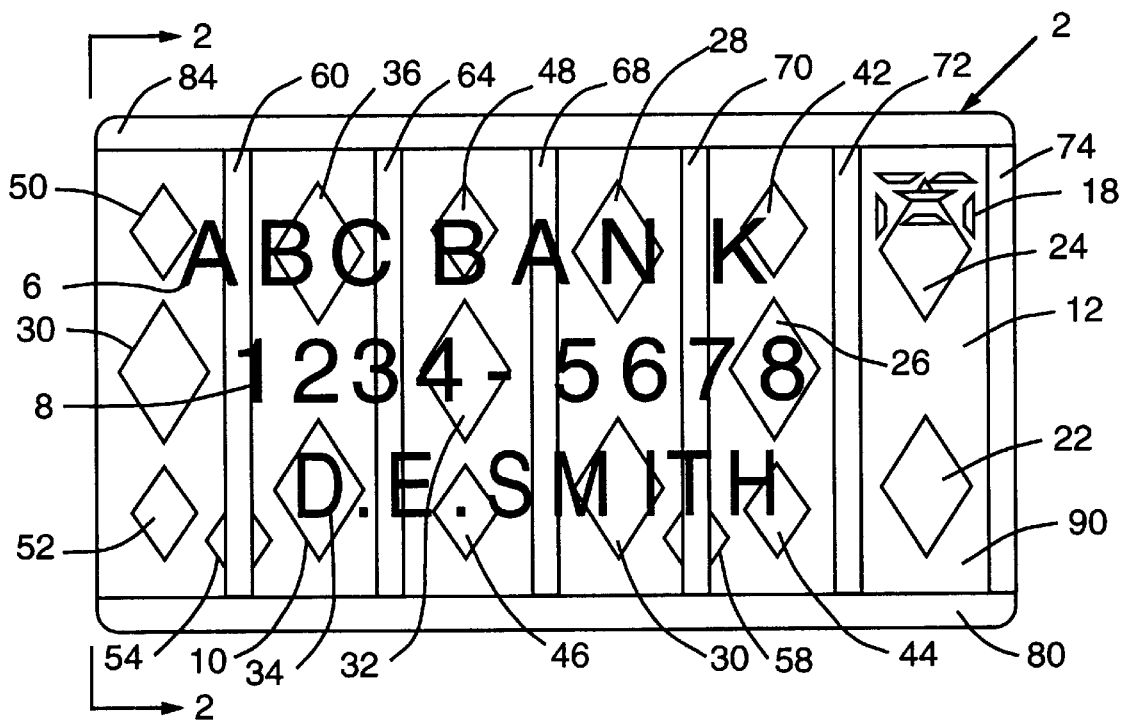
FIG. 1 is a front elevational view of an informational article of the present invention.
Figure 2:
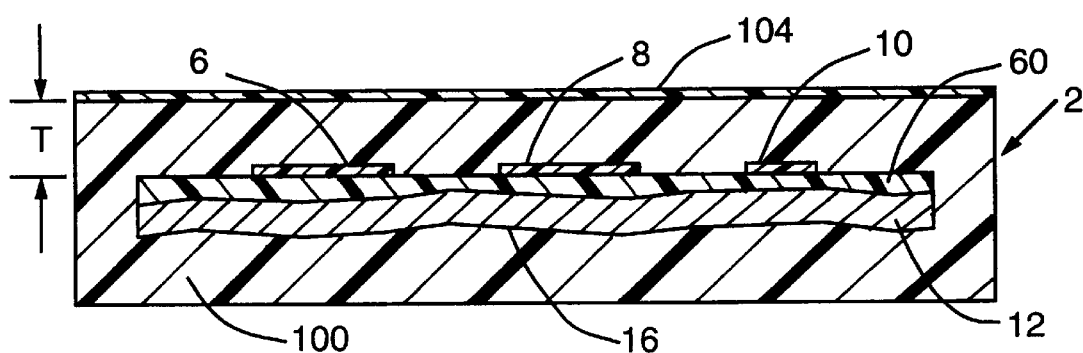
FIG. 2 is a cross-sectional illustration of the informational article of FIG. 1 taken through 2—2.

Referring in greater detail to FIGS. 1 and 2, there is shown a form of informational article 2. The card has a first line of general information 6 which identifies the source of the card as "ABC BANK" and will appear on all cards. This type of information will be regarded for convenience of reference therein as "fixed information," which will appear on every item in the series. Positioned below the fixed information are lines of variable data 8, 10 which is customized to the particular holder of the card. In this example, the card bears number 1234-5678 and the individual is identified as "D. E. SMITH." It is important that the information 6, 8, 10 be protected against (a) alteration by resisting access to the information 6, 8, 10 and (b) photocopying. In this embodiment of the invention a metal foil layer 12 has a hologram indicated generally by the referenced number 60 formed directly in the foil 12 through embossment. This embossed foil 12, therefore, provides both the desired requirement of physical relief and metallizing within the single article. The foil 12 may be aluminum foil or copper foil, for example, and may have a thickness of about 15 to 150 microns. The card 2 may have a total thickness of about 750 microns, for example.

In the specific example of FIGS. 1 and 2, the fixed information will also include the multi-component graphic element 18 which may be of any desired size and shape and may be repeated at two or more locations, if desired. The hologram, in the form shown, consists of a plurality of generally diamond-shaped elements with a first group 22, 24, 26, 28, 30, 32, 34, 36, 38 being of a larger size than the smaller diamonds 42, 44, 46, 48, 50, 52, 54 and 58. In the form shown, the diamonds are positioned across the informational article 2 and are generally grouped into vertical arrays of two or three diamonds. It will be noted that portions of the information 6, 8, 10 overlie the holograms. In this manner, any effort to counterfeit as by photocopying and subsequently alter the photocopy will be resisted as the hologram will interfere with such copying and alteration.

As a further security measure, portions of the informational article will be of a substantially different color than other portions. Such portions are preferably provided in positions generally overlying the hologram and underlying the information. In the form shown, a plurality of generally vertically oriented, generally parallel lines 60, 64, 68, 70, 72, 74 and a pair of generally parallel end portions 80, 84 have a color which contrasts substantially with the remaining background color indicated generally by the reference number 90 of the remainder of the card. It will be noted that, in the form shown, color band 60 overlies hologram 54 and underlies the letter "A" in the fixed information. Color band 64 underlies a portion of the letter "C", a portion of the number "3" and a portion of letter "E". Color band 68 underlies a portion of the second letter "A" in the fixed information 6 and color band 70 underlies a portion of the number "7" and the letter "T" while overlying hologram segment 58. The number "8" overlies hologram 26. It will be appreciated that various combinations of such features may be employed to provide the desired degree of security.

As shown best in FIG. 2, a resinous plastic material 100 encapsulates the hologram containing metal foil 12, fixed information 6, and variable information 8, 10, as well as the color bands 60, 64, 68, 70, 72, 74. It is preferred that the thickness "T" of the resinous plastic material portion overlying the foil 12 and hologram, be about 10 to 20 mils. In a preferred embodiment, an overlying anti-abrasive coating 104 may be secured to the resinous plastic material 100 preferably, while the resinous plastic material is at an elevated temperature so as to take advantage of the heat contained therein. The resinous plastic material may, for example, be polyethylene. The resinous plastic material is preferably thermoplastic as any melting of the same will tend to damage or destroy the information 6, 8, 10. The resinous plastic material 100 and the anti-abrasive coating 104, if used, should be transparent so as to permit ready visual observation of the information 6, 8, 10.

Figure 3:
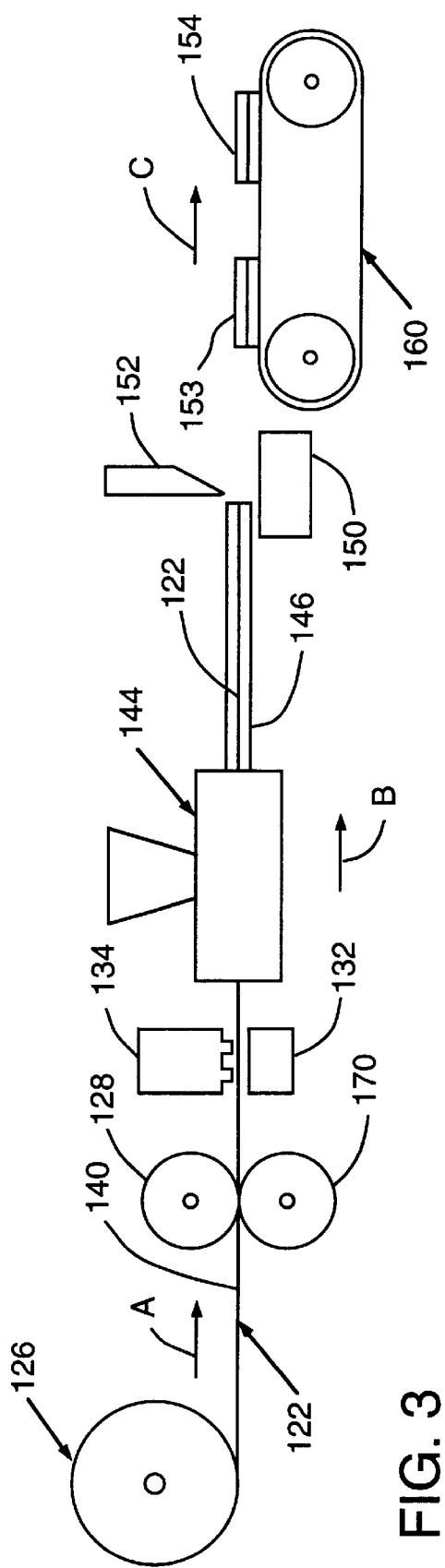
FIG. 3 is a partially schematic illustration showing the method of making an informational article of the type shown in FIGS. 1 and 2.

FIG. 3 shows a schematic illustration of a method of making the informational article of FIGS. 1 and 2. A coil 126 of metal foil, such as aluminum foil, may be either single width or multiple width, depending upon the informational article being made. There may be not only severance of longitudinal segments to create individual informational articles, but also creating a plurality across the width of the strip requiring additional slitting to separate the individual informational articles. Cooperating rolls 128, 170 serve to emboss the foil 122 as it passes therebetween to create a hologram in the foil. The foil moving in the direction indicated by the arrows A, B, C is then subjected to a printing operation wherein the cooperating printing means 132, 134 causes "information" to be provided on upper surface 140 of the foil 122 overlying the hologram. The foil then enters extruder 144 wherein the foil 122 containing on its upwardly facing surface the hologram and overlying information is encapsulated with a resinous plastic material 146 to create the construction shown generally in FIG. 2. If it is desired to have an overlying anti-abrasion layer 104, this may be applied as either a coating or a film after extrusion, but preferably during the period of time that the resinous plastic material 146 is at an elevated temperature. This will help bond the anti-friction coating 104 to the underlying resinous material 146. If the anti-abrasive material is supplied as a film, a suitable reel (not shown), may serve as the source of the film and a pair of rolls (not shown) applying pressure cause layer 104 to be urged into intimate contact with the upper surface of the resinous plastic material 146. A cutter which may consist of an anvil base 150 and a cutting element 152, which is well known to those skilled in the art, severs the longitudinal product into a plurality of individual informational articles, such as 153, 154, which are transported by endless belt conveyor 160 to the desired cooling, packaging or storage area.

If desired, a bar code (not shown) may be provided in protected position within resinous plastic material 100 overlying hologram, but not interfering with information 6, 8, 10.

It will be appreciated that the embodiment of FIGS. 1 and 2 isolates the information 6, 8, 10 from direct access and alteration. Also, the presence of the hologram, the bands of material of different color and the positioning of the information with respect to both will resist photocopying and alteration of the photocopy in efforts to counterfeit the same. This is accomplished in a streamlined manner with a minimum number of material layers.

Figure 4:
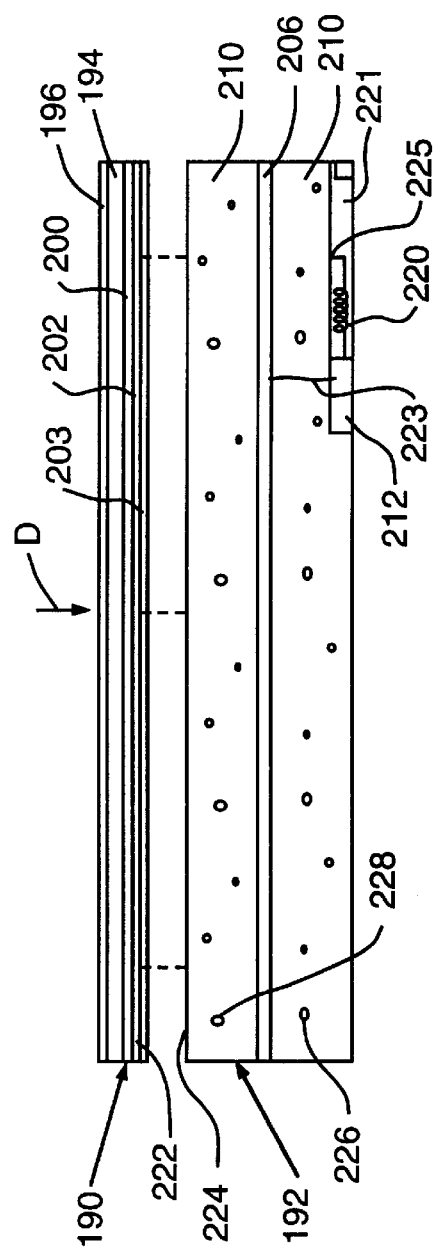
FIG. 4 is a partially exploded view showing a portion of the process of making an informational article of another embodiment of the present invention.
Figure 5:
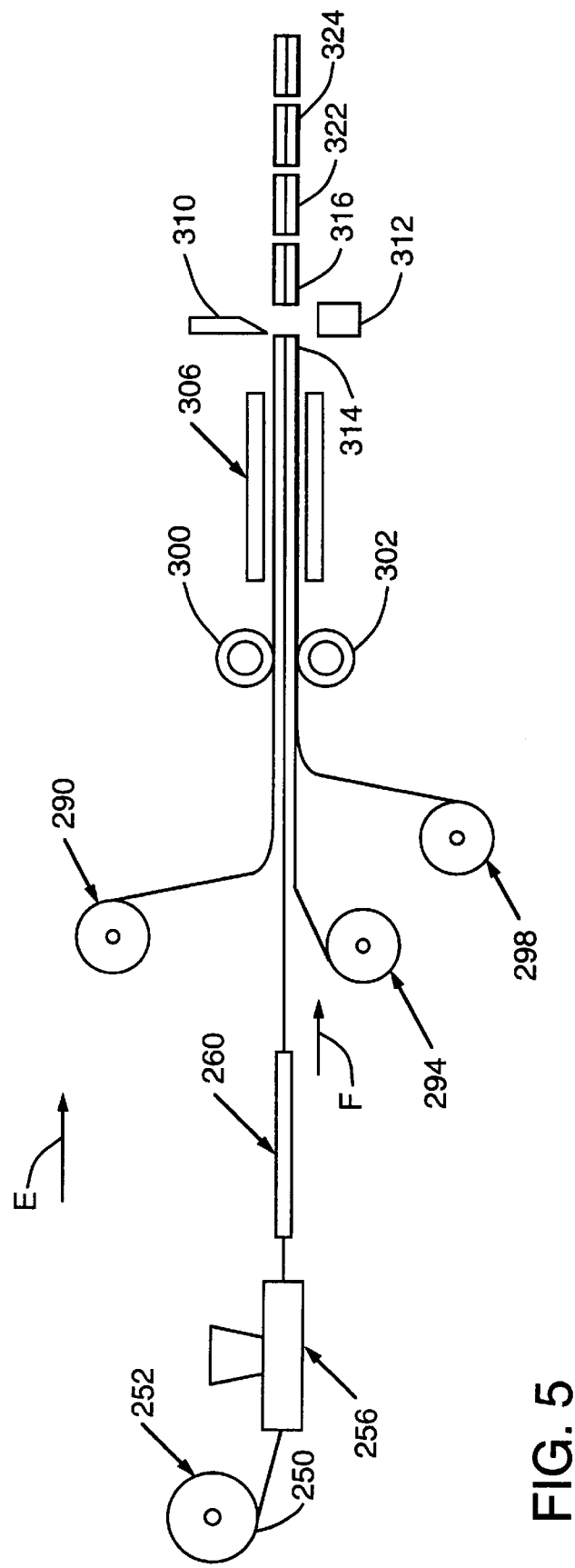
FIG. 5 is a schematic illustration of a method of making the informational article of FIG. 4.
Figure 6:
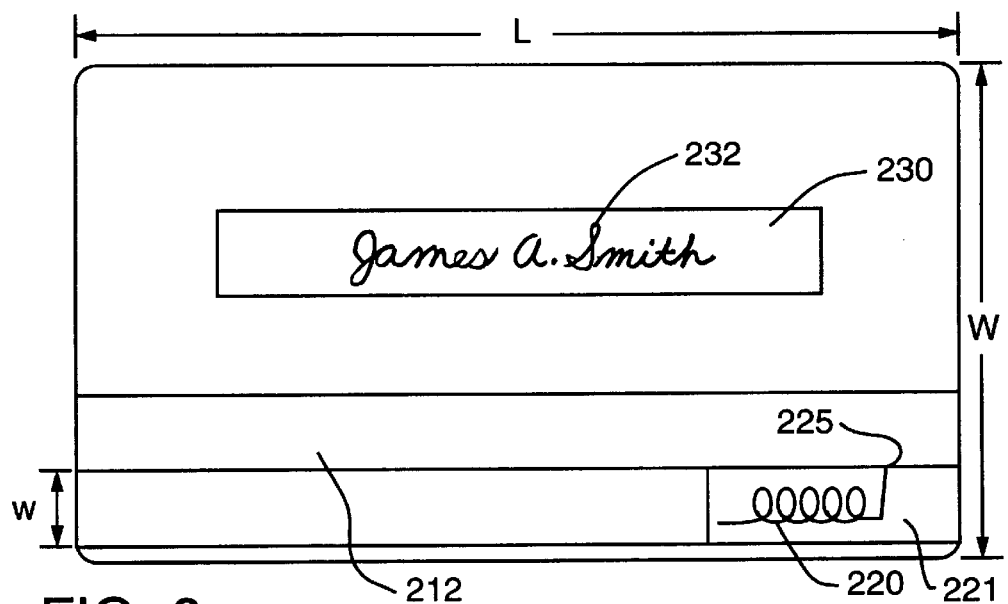
FIG. 6 is a bottom plan view of the informational article of FIG. 4.

Referring to FIGS. 4 through 6, another embodiment of the invention will be considered. In this embodiment of the invention the informational article is created from a lens 190 and a base 192. The lens has a resinous plastic film 194 which may be composed of a polyester or polypropylene, for example, and may have an overlying transparent anti-abrasive coating 196. It is preferred that the film 194 have a thickness of about 10 to 25 percent of the overall card thickness. An embossed hologram 200 is formed in the underside of the lens 190 and information 202 is provided adjacent to the hologram 200 which is subsequently metallized 203 as by coating or foil. The lens 190 will permit viewing from above with the hologram 200 partially overlying the information 202, which may preferably be created by extrusion. Base 192 has a metal core 206 encapsulated within a resinous plastic material 210. In the embodiment shown, a magnetic storage media layer 212, which may take the form of a magnetic strip, has a length which is co-extensive with the length L of the informational article 216 which, in the form shown, is a card having a width W. An antenna member 220, disposed within zone 221, which may also be composed of metal, is positioned in spaced adjacency to the magnetic strip 212 as shown in FIG. 6. As shown in FIGS. 4 and 6, the antenna 220 is connected to the magnetic strip 212 which by lead 223 is connected to ground 206. The magnetic strip 212 may be secured to the informational article 216 by lamination or hot stamping. The antenna 220 may be composed of metal wire or cooled metal foil or may be printed with electrically conductive ink on the article in a predetermined pattern. The antenna 220 can also be created by establishing a metallized zone on the card surface. In the form shown in FIG. 6, antenna 220 has a width w (FIG. 6). In assembling the article shown in FIG. 6, the lower surface 222 of the lens 190, is secured to the upper surface 224 of the base 192, preferably while the extruded material 210 is at an elevated temperature so as to facilitate effective securement, preferably under the influence of applied pressure as by rolls urging the lens 190 and base 192 together. It will be appreciated that in this manner the information 202 is effectively shielded from direct access without at least partial destruction of the assembly and yet, it is readily visible from a position indicated by the arrow D in FIG. 4. It will be appreciated also, that information may be provided by the card 216 through visual means as viewed from arrow D by the naked eyes, as well as through machine reading information contained on the magnetic strip 212 which cooperates with antenna 220 and ground 206.

In order to provide additional resistance to undesired photocopying of the informational article, a plurality of particles, such as 226, 228, are intermixed with the resinous plastic material 210, such that the particles which are preferably rather small, and may be glass beads or hologram fragments. These particles may occupy about ¼ percent to ¾ percent of the total volume of the resinous plastic material 210 or metal foil particles, for example.

Referring again to FIG. 6, it will be noted that a zone 230 of a different colored material which may, for example, be an opaque ink, is provided so that the card holder may put his or her signature 232 over zone 230 as a further security measure.

Referring to FIG. 5, a schematic illustrating a method of making the cards shown in FIGS. 4 and 6 will be considered. In this embodiment, the flow is in the direction indicated by the arrow E. The metal foil 250 which may advantageously be aluminum or copper strip, is fed from reel 252 and enters extruder 256 which serves to encapsulate the metal foil with a resinous plastic material as shown at 260. Subsequently, as the material moves in the direction indicated by arrow F, the previously created lens 290 which has the underlying metallized hologram 200 and information 202 (FIG. 4), as well as the transparent film 194 and anti-abrasive transparent layer 196, is delivered to the upper surface of encapsulated metal foil 260. The magnetic strip 294 is delivered to the undersurface of encapsulated metal foil 260 with the metal antenna 298 which may be composed of aluminum, copper or other electrically conductive material being applied to the assembly. Rolls 300, 302 apply pressure to the encapsulated metal core 260, the magnetic strip 294, the antenna 298 and the lens 290, to urge the assembly into firm self bonding which is contributed to by the extruded resinous plastic material being at an elevated temperature. It will be appreciated that the resinous material is transparent so that the metal layer 250 will serve to render the hologram 200 visible.

The assembly is then moved through cooling zone 306 wherein the temperature is reduced to about 40° F. to 80° F. The cutter means 310, 312, which may be any conventional means, serves to sever the elongated informational article 314 into a plurality of individual informational articles, such as 316, 322, 324, for example. The articles may be individual cards, such as a card selected from the group consisting of debit cards, smart cards, identification cards, organization membership cards, security cards, security entry permits and other information providing articles. In the event that the informational articles emerging from cooling means 306 are of multiple width cutting in the longitudinal direction, will be required to create individual cards.

It will be appreciated that in this embodiment the metal foil 250 serves as a ground to minimize undesired loss of information from the magnetic strip and facilitate efficient communication between the magnetic strip and machines which are capable of communicating with the card by delivering information thereto and receiving information therefrom. Also, the antenna 298 is composed of metal and serves to enhance efficiency of communication between the card and the operatively associated piece of equipment.

Figure 7:
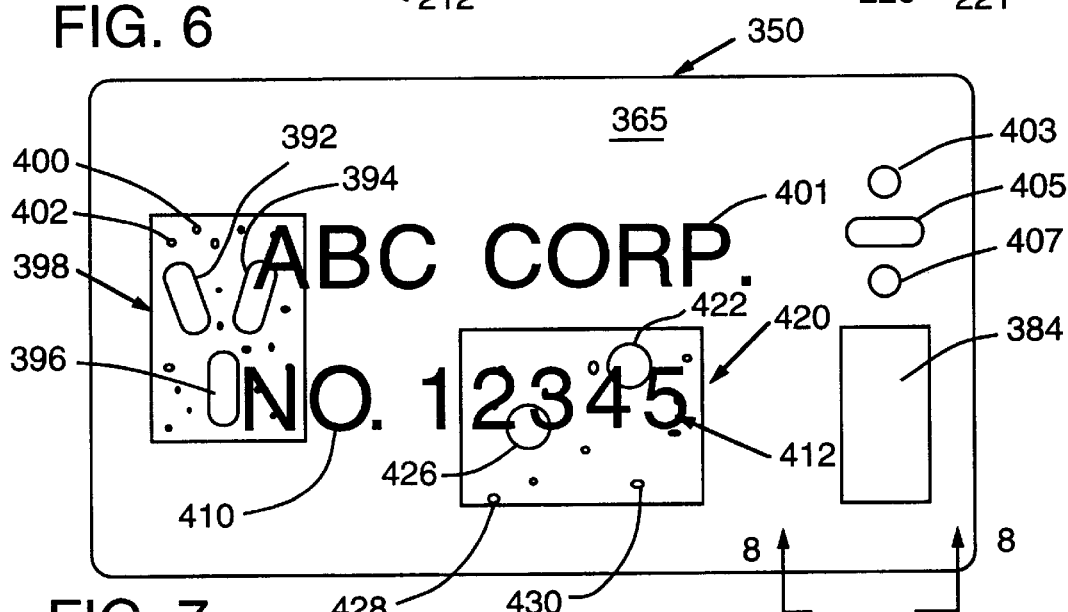
FIG. 7 shows a modified form of informational article of the present invention.
Figure 8:
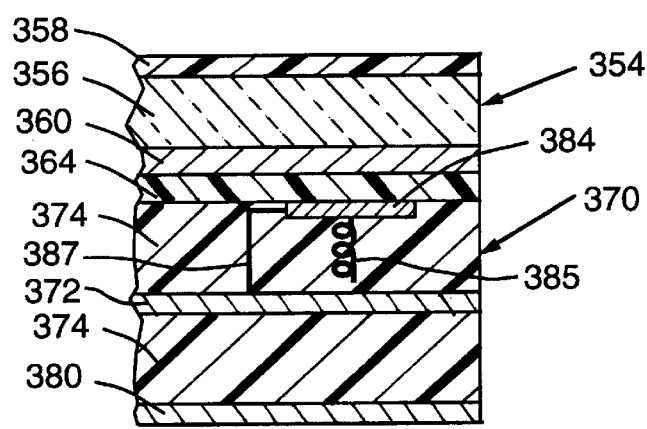
FIG. 8 is a cross-sectional view showing a portion of the informational article of FIG. 7 taken through 8—8.
Figure 9:
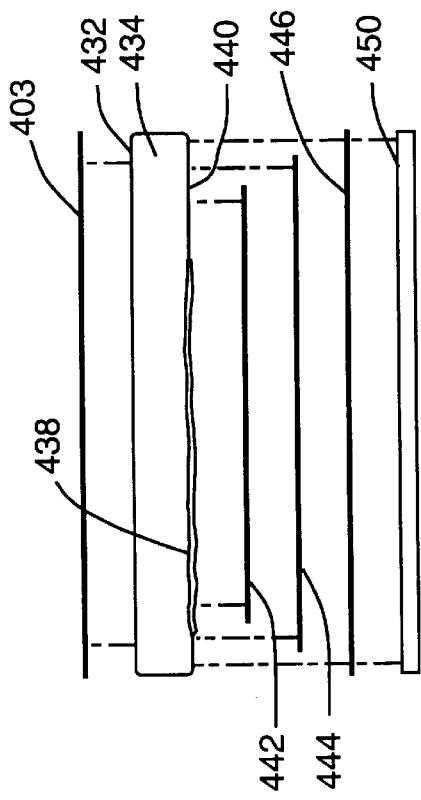
FIG. 9 is a schematic exploded view of a form of informational article of the present invention.

Referring to FIGS. 7 through 9, a further embodiment of the invention will be considered. The informational article 350 has a transparent lens 354 and an underlying base 370. The lens 354 includes a transparent film 356, an overlying anti-abrasive layer 358, an underlying hologram 360 formed by embossment of the film 356 and the information 364. The underlying base 370 which includes a metal foil core 372, an encapsulating resinous plastic material 374, and an antenna 380. A magnetic storage media takes the form of a microchip 384 which is secured to antenna 385 both of which are received within a recess in the base 370 of the informational article and may contain a storage capacity on the order of number 8K or substantially greater, for example. The microchip is connected to metal core 372 by lead 387. In this embodiment of the invention, the hologram portion that is visible will be contained within the rectangle 398 which, in the form shown, has three elongated hologram elements 392, 394, 396 in a transparent portion of the informational layer 364, thereby permitting the underlying metal layer 372, to enable the hologram to be visualized. In order to enhance the resistance to reproduction by photocopying, a plurality of particles, such as 400, 402, are provided within the resinous plastic material within rectangle 398 so as to resist undesired photocopying. The particles preferably occupy a volume which is about ¼ to ¾ percent of the total volume of the resinous plastic material. As the remaining portion 365 of the informational article 350 is opaque, the hologram will not be visualized as the metal layer 372 underlies the opaque portion 365 which, in the form shown in FIG. 7, is present on all portions of the informational article 350 as viewed in FIG. 7, except sections 390 and 420. The opaque portion 365 serves as an area for receipt of a portion of the information which will be discussed herein provides the visual impression. The opaque portions may be created by any means known to those skilled in the art, such as impregnation in portions of the transparent film 356 or by surface colorings. A preferred approach is to provide a colored film with open or transparent windows overlying the hologram.

It will be noted that the information may be considered to be the elements designated generally by the number 401. The legend "ABC CORP." which may be standard information present on all of the cards and also, a corresponding series of graphic components 403, 405, 407 which are preferably of contrasting color with respect to the base informational portion 365 such that the information is readily visible. The standard information may also include "No." 410. The variable data may consist of the numbers following "No." 410," as identified by the number 412 and, in the form shown, consists of the numbers "12345" which may be employed to identify a particular entity or individual. It is noted that a portion of the first portion 398 of the hologram which in the form shown is rectangular. The standard information 401, 410, is in the second portion 420 of the hologram in the form of a rectangle contains graphic components 422, 426 and particles, such as 428, 430, with a portion of the numbers "2, 3" and the numbers "4, 5" positioned thereover. As a result, the information 401, 403, 405, 407, 410 and 412 is protectively encased within the assembly. Efforts to gain access to the same will result in at least partial destruction and a visible indication of such efforts. Also, efforts to reproduce the information or reproduce and alter the information, as by photocopying or other counterfeiting means, will be resisted as a result of the holograms and the associated particles.

It will be appreciated that the informational layers may be provided with whatever contrasting colors, graphic components, print fonts, or combinations thereof and other features so as to enhance visibility and resist alteration and reproduction.

Referring to FIG. 9, an exploded view of a form of the embodiment shown in FIGS. 7 and 8 will be considered. The assembly has an abrasion resistant coating material 403 which is to be secured to the upper surface 432 of transparent film 434 which contains a hologram 438 embossed in a lower surface 440 thereof. In this embodiment film containing a first print color 442 and certain transparent portions, as well as film 444, which contains a second print color and certain transparent portions, provides the "information" in underlying contacting relationship to the film 434, which film may be made of polyester, for example, and have a thickness of about 0.5 mil to 2 mils. A metal foil layer 446 will serve to visualize those portions of the hologram 438 which have transparent sectors within both films 442 and 444. It will be appreciated that in lieu of employing the preprinted films 442, 444, the information may be printed on the hologram 438. Base portion 450, which is shown only schematically, will be the resinous plastic material having a metal foil core, as hereinbefore described, and suitable magnetic storage media, such as microchip 384, as well as an antenna, if desired. The information article, in lieu of having magnetic storage media, may have other means for communicating information, such as a bar code, which may be read by an appropriate operatively associated piece of equipment.

Figure 10:
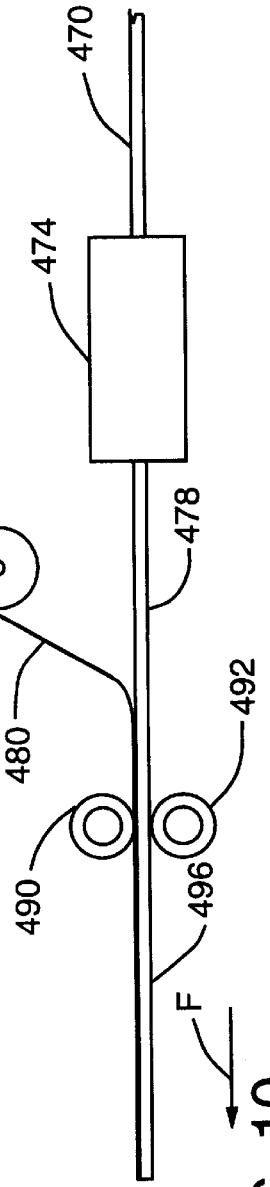
FIG. 10 is a schematic illustration of a method of manufacturing the informational article of the present invention.

Referring to FIG. 10, the structures disclosed in FIGS. 7 through 9 may readily be made by the method shown schematically in FIG. 10. A suitable carrier which will function as the core 470 of the base and may be a metal foil, such as aluminum or copper, for example, will enter an extruder 474. The resinous plastic material may, for example, be a polyester, an acrylonitrile butadiene and styrene (ABS) copolymer or a vinyl monomer or polymer (and put in other parts of application). The information film 480, which is primarily the lens, will include the transparent film, an overlying anti-abrasion layer, if provided, an embossed hologram formed in the film, and one or more layers of the information. Rolls 490, 492 under the influence of pressure and preferably the elevated temperature of the resinous plastic material emerging from the extruder, which may have a temperature on the order of 360° F., create the permanent joinder of the lens to the base.

Figure 11:
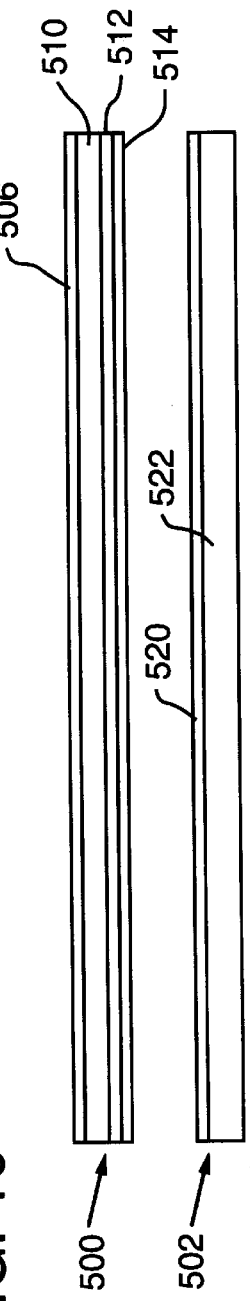
FIG. 11 is an exploded view of another embodiment of the invention.

Referring to FIG. 11, a further embodiment of the invention will be considered. This invention contemplates premanufacture of a portion of lens 500 of the assembly. A retail store or other location having more limited equipment than would be required to make the complete assembly of the other embodiments of the invention, after providing information on a preformed article, would complete the informational article.

In the form shown, the lens 500 has a transparent and preferably substantially rigid resinous layer 510 with an overlying anti-abrasive coating 506 and an underlying integrally formed hologram 512. The product shipped to the final fabricator will consist of the transparent assembly 506, 510, 512, which is preferably substantially rigid. This may be stored, if desired, before completion of the article. The end user will provide the information 514 on the hologram and metallizing will subsequently occur in order to permit the hologram to be readily visualized. While the metallizing can take the form of a coating or spray, in the form shown, the base portion 502 has a resinous layer 522 to the top of which is secured a metallic foil layer 520. The base 502 can be secured to the lens 500 by any desirable means such as self-bonding or adhesive. It will be appreciated that in this manner the durability, information protecting assembly and ready visibility of the information is provided by resisting undesired counterfeiting or altering of the information 514.

It will be appreciated therefore, that the present invention provides means for establishing an effective, cost effective, secure, tamper-resistant and photocopy resisting informational article and the resultant article. All of this is accomplished while facilitating advantageous use of holograms, transparent resinous plastic materials, photocopy resisting particles and providing fixed information and variable information in a secure manner which information is readily visible to the naked eye and/or machine readable. This system contemplates embodiments wherein magnetic storage media and antennas may be employed. Also, bar codes and other identifying means may be used.

Whereas particle embodiments of the present invention have been described herein for purposes of illustration, it will be appreciated by those skilled in the art that numerous variations of the details may be made without departing from the invention, as described in the appended claims.

What is claimed is:

1. A method of creating a tamper resistant informational article comprising
   providing a metal foil,
   forming a hologram in said metal foil,
   creating information on said metal foil at least partially over said hologram, and
   encapsulating said information and said metal foil in a resinous plastic material such that physical access to said information cannot be obtained without destruction of at least a portion of said resinous plastic material.

2. The method of claim 1 including effecting said encapsulation over said metal foil by extruding said resinous plastic material thereover.

3. The method of claim 2 including employing aluminum foil as said metal foil.

4. The method of claim 2 including employing copper foil as said metal foil.

5. The method of claim 2 including creating said information by printing.

6. The method of claim 2 including employing a continuous strip of said foil, and after said hologram forming, information creating and extrusion, severing portions of said strip to create a plurality of informational articles.

7. The method of claim 6 including employing said method to create cards having said information which provides identification.

8. The method of claim 7 including said card being selected from the group consisting of credit cards, debit cards, smart cards, identification cards, organization membership cards and security cards.

9. The method of claim 2 including creating said informational article with an upper surface through which said information is visible and a lower surface, and establishing said resinous plastic material overlying said information in a thickness of about 10 to 20 mils on said upper surface.

10. The method of claim 2 including establishing a plurality of zones of different color from said foil generally adjacent to or overlying said hologram and said information.

11. The method of claim 10 including providing said zone of different color from said information.

12. The method of claim 1 including effecting said encapsulation by injection molding said resinous plastic material over said metal foil.

13. The method of claim 1 including employing as said resinous plastic material a material which is at least partially transparent in order to permit viewing said information.

14. The method of claim 1 including employing said metal foil in a thickness of about 15 to 150 microns.

15. The method of claim 1 including creating said information on a film, and securing said film adjacent to said hologram.

16. The method of claim 1 including providing a bar code as part of said information.

17. A tamper resistant informational article comprising a metal foil core, a hologram formed in said metal foil core, information on said metal foil at least partially overlying said hologram, a resinous plastic material encapsulating said hologram, said information and said metal foil such that physical access to said information cannot be obtained without destruction of at least a portion of said resinous plastic material, and said resinous plastic material being transparent in portions overlying said information.

18. The informational article of claim 17 including said resinous plastic material substantially completely covering said metal foil.

19. The informational article of claim 18 including said metal foil being aluminum foil.

20. The informational article of claim 18 including said metal foil being copper foil.

21. The informational article of claim 18 including said information being printed.

22. The informational article of claim 18 including said informational article being an individual card severed from a continuous strip.

23. The informational article of claim 22 including said information serving to provided identification.

24. The informational article of claim 23 including said card being selected from the group consisting of credit cards, debit cards, smart cards, identification cards, organization numbering cards and security cards.

25. The informational article of claim 18 including said informational article having an upper surface through which said information is visible and a lower surface, and said resinous plastic material having a thickness of about 10 to 20 mils in the portion overlying said information.

26. The informational article of claim 18 including a plurality of zones of different color from said foil adjacent to or overlying said hologram and said information.

27. The informational article of claim 26 including said zones of different color having a different color from said overlying information.

28. The informational article of claim 26 including said hologram having a plurality of components with at least some of said components underlying portions of said information.

29. The informational article of claim 18 including said information disposed on a film.

30. The informational article of claim 18 including a bar code overlying said metal foil core an d encapsulated within said resinous plastic material.

31. The informational article of claim 17 including said resinous plastic material being at least partially transparent to permit viewing of said information therethrough.

32. A method of creating a tamper resistant informational article comprising creating a base having an upper surface and a lower surface by passing a metal core through an extruder which encapsulates said metal core with a resinous plastic material, creating a lens by providing an elongated transparent plastic layer forming a hologram in the lower surface thereof and providing information underlying said hologram, and permanently securing the upper surface of said base to the lower surface of said lens.

33. The method of claim 32 including effecting said securing of said base to said lens while said base extruded resinous plastic material is at an elevated temperature.

34. The method of claim 33 including subsequent to said securing of said base to said lens cooling said lens-base assembly.

35. The method of claim 34 including subsequent to said cooling severing said lens-base assembly into a plurality of information articles.

36. The method of claim 35 including securing a magnetic media storage element to said base, and said magnetic media storage element being an elongated magnetic strip secured generally to the undersurface of said base.

37. The method of claim 36 including securing antenna means to said magnetic media storage element.

38. The method of claim 35 including employing a microchip as said magnetic media storage element.

39. The method of claim 32 including prior to effecting said resinous plastic material extrusion incorporating a plurality of particles of a different material within said resinous plastic material.

40. The method of claim 39 including incorporating g lass beads as said particles.

41. The method of claim 40 including incorporating said glass beads in a volume percentage of about ¼ to ¾ percent based on the volume of said resinous plastic material.

42. The method of claim 32 including securing an anti-abrasion material to the upper surface of said lens.

43. The method of claim 32 including providing a film between said metal core and said hologram having at least one transparent portion and at least one opaque portion, whereby only portions of said hologram will be visible.

44. The method of claim 43 including providing information on said film.

45. A method of creating a tamper resistant informational article comprising creating a base having an upper surface and a lower surface by passing a metal core through an extruder which encapsulates said metal core with a resinous plastic material, creating a lens by providing an elongated transparent plastic layer forming a hologram in the lower surface thereof and providing information underlyin said hologram, securing the upper surface of said base to the lower surface of said lens, effecting said securing of said base to said lens while said base extruded resinous plastic material is at an elevated temperature, subsequent to said securing of said base to said lens cooling said lens-base assembly, subsequent to said cooling severing said lens-base assembly into a plurality of information articles, employing a microchip as said magnetic media storage element, providing information on said film, securing antenna means to such informational article in operative relationship with respect to said microchip, and connecting said microchip to said metal core.

46. A tamper resistant informational article comprising a transparent lens having an upper surface and a lower surface, a hologram formed in the lower surface thereof and information applied to the said hologram, a base having a metal core encapsulated in a resinous plastic material between an upper resinous plastic material layer having an upper surface and a lower resinous plastic material layer, and said upper surface of said base being secured permanently to the lower surface of said lens, whereby said hologram and information will be protectively encased within said article.

47. The tamper resistant informational article of claim 46 including a plurality of particles of a different material disposed within said resinous plastic material.

48. The tamper resistant informational article of claim 47 including said particles being glass beads.

49. The tamper resistant informational article of claim 48 including said glass beads being present in a volume percentage based upon the volume of said resinous plastic material of about ¼ to ¾ percent.

50. The tamper resistant informational article of claim 46 including a magnetic media storage element secured to said base, and said magnetic media storage element being an elongated magnetic strip.

51. The tamper resistant informational article of claim 50 including antenna means secured to said magnetic storage element.

52. The tamper resistant informational article of claim 46 including an anti-abrasion material secured to the upper surface of said lens.

53. The tamper resistant informational article of claim 46 including said information provided on a film.

54. The tamper resistant informational article of claim 46 including said informational article being a card, and said card being selected from the group consisting of credit cards, debit cards smart cards, identification cards, organization membership cards and security cards.

55. The tamper resistant informational article of claim 46 including a film disposed between said metal core and said hologram, and said film having portions which are transparent and portions which are opaque, whereby only portions of said hologram will be visible.

56. The tamper resistant informational article of claim 55 including providing information on said film.

57. The tamper resistant informational article of claim 46 including said metal core being aluminum foil of a thickness of about 15 to 150 microns.

58. A tamper resistant informational article comprising a transparent lens having an upper surface and a lower surface, a hologram formed in the lower surface thereof and information applied to the said hologram, a base having a metal core encapsulated in a resinous plastic material, the upper surface of said base being secured to the lower surface of said lens, whereby said hologram and information will be protectively encased within said article, a magmetic media storage element secured to said base, said magnetic media storage element being an elongated magnetic strip, antenna means secured to said magnetic storage element, employing an aluminum foil strip as said core material to provide an electromagnetic ground, and connecting said magnetic storage element to said foil strip.

59. A method of creating a tamper resistant informational article comprising creating a substantially rigid transparent lens having a hologram formed therein, creating information on said hologram, metallizing said information containing hologram, and covering said metallized information containing hologram with a resinous layer, whereby destruction of said resinous layer would be required to physically access said information.

60. The method of claim 59 comprising effecting said metallizing by securing a metal foil layer to said information containing hologram.

61. The method of claim 59 comprising effecting said metallizing by applying a metallizing coating to said information containing hologram.

62. The method of claim 59 including after creating said substantially rigid hologram containing transparent lens but prior to creating said information thereon storing said lens.

\* \* \* \* \*

UNITED STATES PATENT AND TRADEMARK OFFICE
CERTIFICATE OF CORRECTION

PATENT NO.    : 6,164,548
DATED         : December 26, 2000
INVENTOR(S)   : Yoram Curiel Page 1 of 1

It is certified that error appears in the above-identified patent and that said Letters Patent is hereby corrected as shown below:

Column 1,
Line 11, "and" should read -- any --.
Line 34, "effects" should read -- effect --.

Column 10,
Line 50, "particle" should read -- particular --.

Column 12,
Line 18, "numbering" should read -- membership --.
Line 41, "an d" should read -- and --.

Column 13,
Line 22, "g lass" should read -- glass --.
Line 46, "underlyin" should read -- underlying --.

Column 15,
Line 6, "magmetic" should read -- magnetic --.

Signed and Sealed this

Twenty-ninth Day of January, 2002

Attest:

JAMES E. ROGAN
Attesting Officer
Director of the United States Patent and Trademark Office